G. J. SPOHRER & W. E. BEAN.
SIGNALING DEVICE.
APPLICATION FILED APR. 4, 1914.
1,138,023.
Patented May 4, 1915.
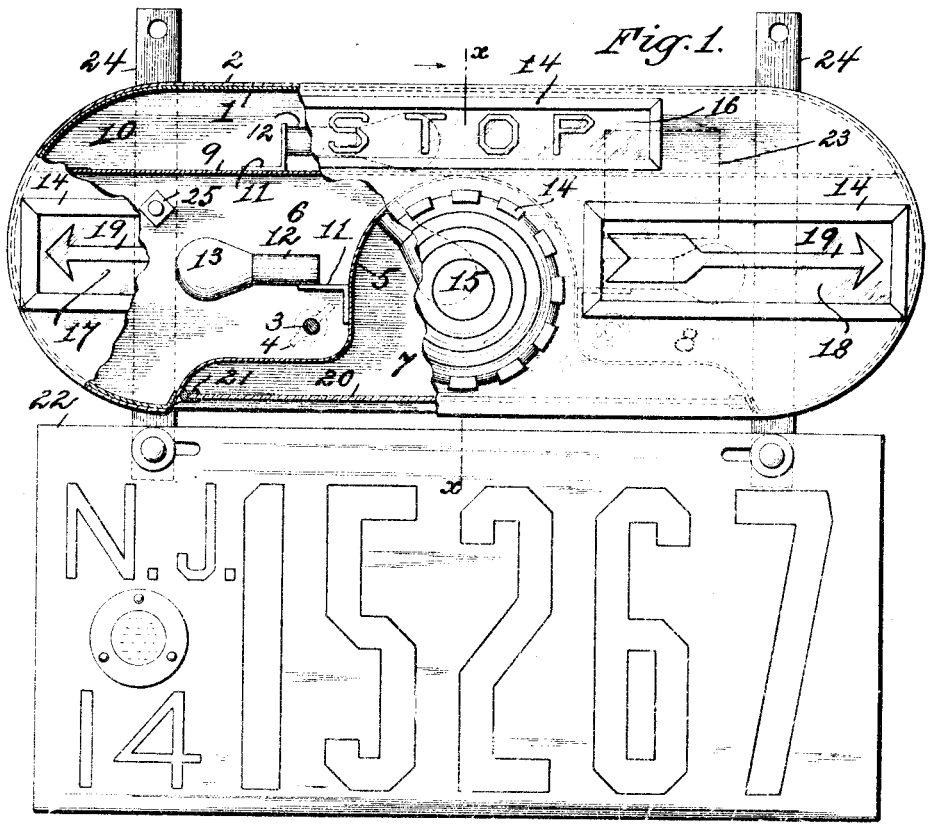
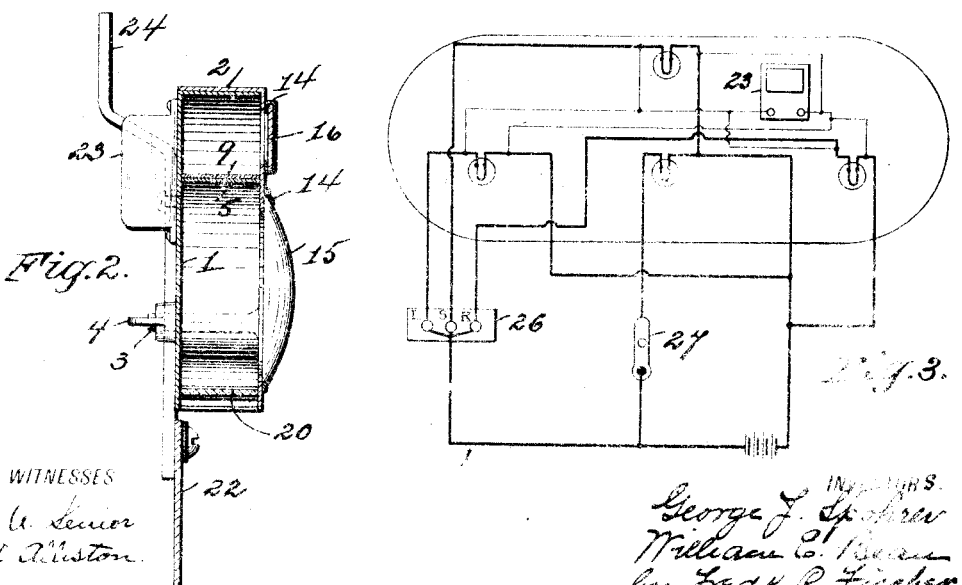
WITNESSES
INVENTORS
George J. Spohrer
William E. Bean
by Fredk C. Fischer
ATTORNEY

UNITED STATES PATENT OFFICE.

GEORGE J. SPOHRER AND WILLIAM ELERY BEAN, OF NEWARK, NEW JERSEY.

SIGNALING DEVICE.

1,138,023.  Specification of Letters Patent.  Patented May 4, 1915.

Application filed April 4, 1914. Serial No. 829,423.

*To all whom it may concern:*

Be it known that we, GEORGE J. SPOHRER and WILLIAM ELERY BEAN, citizens of the United States, residing in the city of Newark, in the county of Essex and State of New Jersey, have invented certain new and useful Improvements in Signaling Devices, of which the following is a full, clear, and exact description, such as will enable others skilled in the art to which it pertains to make, construct, and use the same, reference being had to the accompanying drawings, and to numerals of reference marked thereon, forming a part of this specification.

This invention relates to signaling devices for use upon the rear end of automobiles and the like, to illuminate the number or license tag and to indicate to the automobilist following that the forward automobile is about to stop, or is to turn to the right or left by simultaneously flashing a light and sounding a signal.

The object of the invention is to provide a simple, inexpensive and efficient signaling device in combination with a license tag, which can be easily mounted in place upon an automobile and readily operated by any convenient form of a switch.

The invention consists in the construction and arrangements of the parts to be more fully described hereinafter and particularly pointed out in the claims.

Reference is to be had to the accompanying drawings forming a part of this specification, in which a preferred embodiment of our invention is illustrated, and in which—

Figure 1 represents a front view of our improved signaling device, parts being broken away, showing the license tag associated therewith. Fig. 2 represents a sectional end view, taken on lines x—x of Fig. 1, and looking in the direction indicated by the arrow; and Fig. 3 represents a diagrammatic view showing the signal controlling means and also illustrating the wiring.

Similar numerals of reference indicate corresponding parts in all of the views.

In the drawings, 1 represents a signal casing made from sheet metal or the like, of any convenient form. Secured to the casing 1 is a telescoping cover 2 also made from sheet metal or the like, and of the same general outline as the casing 1, to which it is removably fitted by means of the rigid bolts 3, which are conveniently secured to the inside of the cover 2 and passing through apertures in the signal casing 1. Wing nuts 4 having screw-threaded engagement with the bolts 3 serve to lock the casing and cover together.

5 represents a reflector in the form of a partition mounted in the casing 1 and of the shape indicated in Fig. 1 of the drawings, and so arranged as to divide the lower portion of the casing into three compartments numbered 6, 7 and 8 respectively. A partition 9 mounted in the casing 1 directly above the partition 5 and extending across the casing forms another compartment 10. A piece of glass 20 is mounted in guides 21 which are secured to the ends of the reflector 5 in order that the light may be directed upon the license tag 22. The lower wall of the cover 2 is cut away at that point where the glass 20 is located. Brackets 11 conveniently secured to the partitions 5 and 9 are adapted to support lamp sockets 12 and suitable incandescent lights 13.

The cover 2 is provided with a series of rims 14 to receive transparent plates of glass or other suitable material. The plate 15 which is circular in form, is preferably red and with the light, constitutes the tail light. The plates 16, 17 and 18 which are oblong, are preferably green. The plate 16 with the light constitutes the stop signal and for convenience sake, may be provided with the word "Stop" painted thereon. The plates 17 and 18 which are located one on each side of the tail light or plate 15 and which are also green and provided with arrows 19 pointing in opposite directions, constitute the left and right signals.

23 represents a buzzer, bell or the like, secured in any convenient manner and at any convenient point to the rear of the casing 1.

Two brackets 24 secured to the rear of the casing 2 by means of nuts 25, serve to secure the device to the vehicle and at the same time provide means for adjustably securing the license or number tag 22 to the device.

Referring to Fig. 3 of the drawings, it will be seen that for convenience sake, we employ two switches 26 and 27, of any desired form, which may be mounted in any convenient place, preferably on the steering wheel, the switch 26 being provided with three buttons or the like, and the switch 27 with but one button or lever. The switch 27 operates the red tail light signal 15, and the switch 26 operates the buzzer, bell or the like 23, and simultaneously one of the other three signal lights, numbered 16, 17 and 18 respectively, by simply pressing one of the buttons.

Whenever the driver wants to indicate that he will stop, he pushes the button marked S on the switch 26, and the incandescent light in the compartment 10 is lighted, and the buzzer or sounding device 23 is sounded, and if the driver should desire to indicate that he will turn to the left or to the right, he has but to push the proper button L or R of the switch 26, and the incandescent light in the compartment 6 or 8 will be lighted, and the buzzer or sounding device 23 will be sounded, to display the proper signal at the rear of the automobile.

It is of course understood that the tail light 15 at night is always burning, by keeping the switch 27 turned on, in order to operate said light, and to illuminate the license or number tag 22.

Thus it will be seen that this improved signaling device is useful in day time or night time, and that when used in day time or night time, no electricity flows through the device except when the driver desires to make use of his signals.

In the drawings, we have shown the entire lighting and signaling system of an automobile put into circuit with the tail light 15 as shown in the diagrammatic view, Fig. 3, but it is to be understood that the tail light and the signal lights, if desired, as well as the buzzer, can be operated from other suitable sources of electrical supply.

Experience has demonstrated that the organization above described is a highly efficient one, and while the device shown and described is the preferred embodiment of our invention, we do not wish to be limited to the exact details of construction and combination herein shown and described, as obvious modifications thereof, not involving the exercise of invention, may be made by any one skilled in the art, and such departures from what is herein shown and described, we consider within the scope and terms of our claims.

We claim:

1. A signaling device of the character described, comprising a casing, a partition located within and parallel with the upper portion of the casing, and a reflector located in the lower portion of the casing dividing said casing into four compartments, a transparent glass carried by the lower edge of said reflector, a telescoping cover secured to said casing having transparent material therein, the lower side of said cover being cut away to expose the glass in said casing.

2. A signaling device of the character described, comprising an oblong casing, a partition located within and parallel with the upper portion of the casing, and a reflector located in the lower portion of the casing having a centrally-arranged curved portion dividing said casing into four compartments, a transparent glass carried by the lower edge of said reflector, a telescoping cover secured to said casing having transparent material therein, the lower side of said cover being cut away to expose the glass in said casing.

3. A signaling device of the character described, comprising an oblong casing, a partition located within and parallel with the upper portion of the casing, and a reflector located in the lower portion of the casing dividing said casing into four compartments, guides carried by said reflector, a transparent glass located between said guides and carried by the lower edge of the reflector, a telescoping cover secured to said casing having transparent material therein, the lower side of said cover being cut away to expose the glass in said casing.

4. A signaling device of the character described, comprising an oblong casing, a partition located within and parallel with the upper portion of the casing, and a reflector located in the lower portion of the casing dividing said casing into four compartments, a transparent glass carried by the lower edge of said reflector, a telescoping cover, means located on the inside of the cover and passing through apertures in the casing for removably securing the cover to the casing, said cover being provided with transparent material, the lower side of said cover being cut away to expose the glass in said casing.

5. A signaling device of the character described, comprising an oblong casing, a partition located within and parallel with the upper portion of the casing, and a reflector located in the lower portion of the casing dividing said casing into four compartments, a transparent glass carried by the lower edge of said reflector and located within the lower portion of the casing, a telescoping cover secured to said casing having transparent material therein, the lower side of said cover being cut away to expose the glass in said casing, and means located on the back of the casing for securing the device to a vehicle and for supporting a license tag.

This specification signed and witnessed this second day of March, 1914.

GEORGE J. SPOHRER.
WILLIAM ELERY BEAN.

Witnesses:
FREDK. C. FISCHER,
CLIFFORD A. ALLISTON.